United States Patent [19]

Gorman

[11] 4,403,734
[45] Sep. 13, 1983

[54] EXPANDING-SLEEVE RAIL FASTENING

[75] Inventor: John T. Gorman, Seven Hills, Australia

[73] Assignee: Lyncross Pty, Ltd., Kenmore, Australia

[21] Appl. No.: 227,521

[22] Filed: Jan. 22, 1981

[30] Foreign Application Priority Data

Feb. 7, 1980 [AU] Australia .............................. PE2284

[51] Int. Cl.³ ............................................. E01B 9/10
[52] U.S. Cl. .................................... 238/372; 238/375; 411/22; 411/45
[58] Field of Search .............. 238/303, 372, 373, 375; 411/21, 22, 34, 45, 46, 74; 52/698, 712

[56] References Cited

U.S. PATENT DOCUMENTS

| 786,037 | 3/1905 | Lakhovsky | 238/373 |
| 912,663 | 2/1909 | Frandsen | 238/373 X |
| 1,586,617 | 6/1926 | Etheridge | 238/373 |
| 2,688,894 | 9/1954 | Modrey | 411/34 |
| 3,355,850 | 12/1967 | Rohe | 411/34 X |
| 4,108,043 | 8/1978 | Varga | 411/34 |

FOREIGN PATENT DOCUMENTS

| 11468 | of 1902 | United Kingdom | 238/373 |
| 1392095 | 4/1975 | United Kingdom | 411/34 |

Primary Examiner—Randolph Reese
Attorney, Agent, or Firm—Stevens, Davis, Miller & Mosher

[57] ABSTRACT

An expanding sleeve device for fastening a rail to a crosstie comprising a headed bolt threaded into a tapered nut. Positioned between the head and nut is a sleeve having radially expandable pronged portions and a deformable collar. The tapered nut causes the pronged portions and sleeve to expand and fit securely in a hole in the crosstie.

6 Claims, 3 Drawing Figures

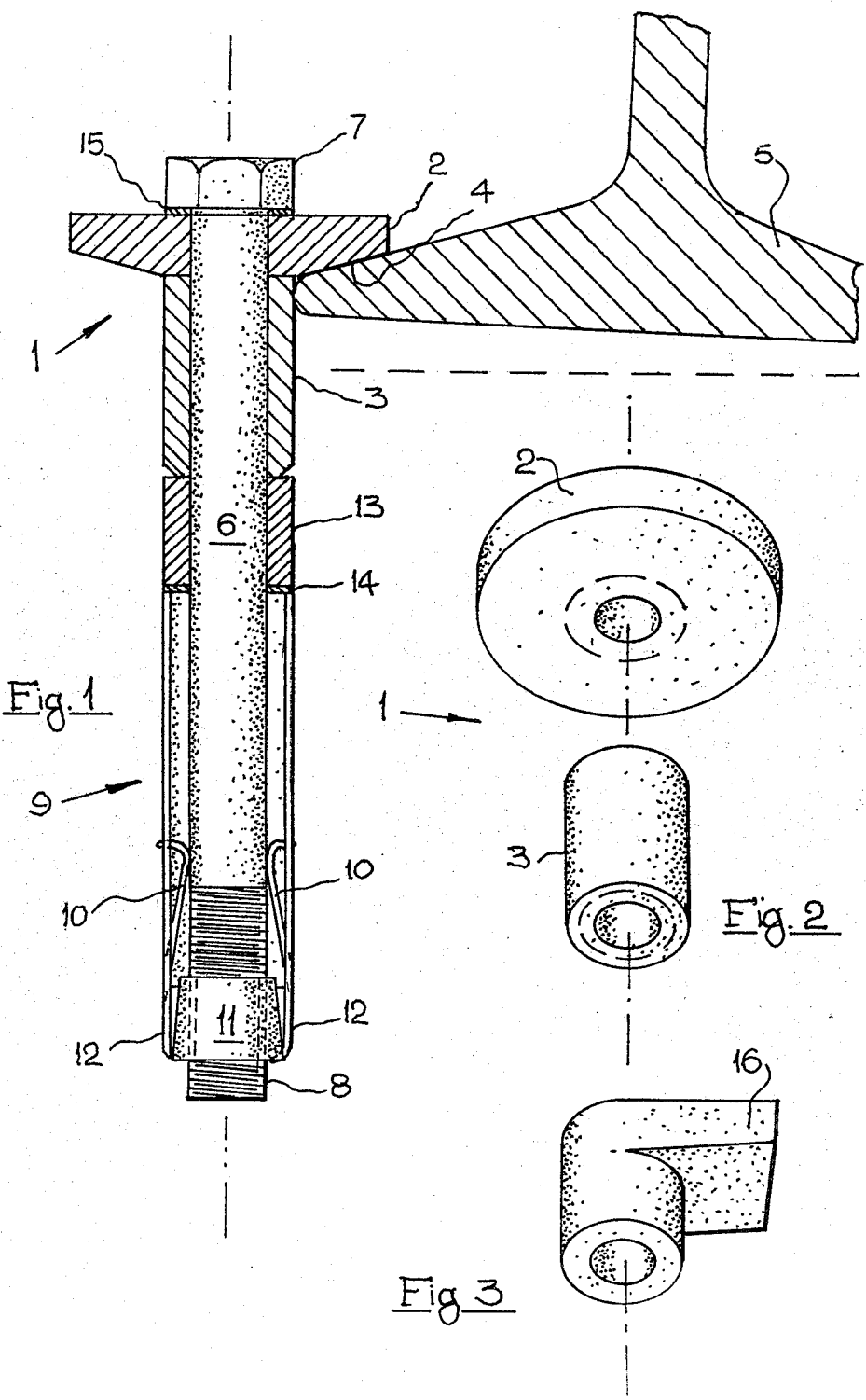

EXPANDING-SLEEVE RAIL FASTENING

This invention relates to rail-to-sleeper fastenings and more particularly to replacements for existing dogspikes having superior holding capabilities compared with the said dogspikes.

In the railway systems of many countries, including Australia, New Zealand, the U.S.A. and some in Europe, rails are dogspiked to the sleepers or crossties through a sleeper plate which is itself spiked down to the sleeper.

In a typical dogspiking arrangement such as is employed in Australia, each sleeper is furnished with two suitably spaced, rectangular sleeper plates affixed to the sleeper by means of split lockspikes which are passed through holes in the sleeper plate and driven into the wood of the sleeper. Upon these sleeper plates are laid the lengths of rail.

Each sleeper plate has running across it, at right angles to the longitudinal axis of the associated sleeper, a pair of raised shoulders between which the rail foot is held and against which the edges of it abut. The upper surface of the sleeper plate, at least that part between the shoulders, is inclined at an angle of 1 in 20 towards the center of the track so that, when a rail is laid on it, it stands at an angle; that is to say, a pair of rails will lean inwardly towards each other.

The most commonly used dogspike is essentially a large blunt spike fashioned from ⅝ inch diameter steel rod. The head is shaped by drop-forging to fit snugly against the foot of the rail and to extend over the foot by approximately ⅜ inch when fully driven in. The dogspike is driven home, either by striking with a sledge hammer or by using a pneumatic impact tool, into a predrilled hole of 13/16 inch bore. When the dogspike has been driven through an appropriate hole in the sleeper plate and on down into the sleeper, it is intended that the rail foot should be held firmly down onto the sleeper plate between the previously-mentioned shoulders.

The permanent way of a railway system is required to withstand quite massive applied forces, including something in the order of a 20-ton downwardly-directed component and an 8-ton outwardly-directed component per axle. The downwardly-directed component is initially taken over a quite small area of rail and transmitted through the sleeper plates and on to the sleeper. The sleepers further spread the load onto the ballast and in turn to the sub-soil structure beneath.

When a train rides over a section of track, the whole track will move slightly and evenly up and down so long as the rails are securely held to the sleepers.

The outwardly-directed forces naturally tend to push the rails apart, that is, to widen the gauge of the track. Now, if the rails are securely held to the sleepers, the outer shoulder will quite effectively withstand the sideways force and so prevent spread of the rails at the foot thereof. This sideways force will also tend to push the rails over and it is partly to combat such tendency that the rails are arranged to lean inwards towards each other by virtue of the inclined upper surfaces of the sleeper plates, as previously described. This angling of the rails, as will be readily appreciated, will also tend to cause increased spread at the foot of the rails as a result of the outwardly-directed force component but, if the dogspikes are firmly embedded in the wood of the sleepers, this spread is prevented.

While the 'life' of a sleeper cut from the kinds of wood used in Australian railway systems may be about 20 years, depending on traffic and drainage factors, its effective working life may be very drastically reduced if a spike loses its simple friction hold and pulls out; a spike cannot be replaced successfully as the integrity of its fit in the bore is irrevocably lost, and one loose dogspike will cause the others to pull loose, due to the increased load, so that the rail pulls away from the sleeper. When this occurs and the sleeper becomes a loose sleeper, the downward force occasioned by a train will cause the rail at that point to strike the loose sleeper with considerable impact. The struck sleeper hammers down into the ballast and spreads it, and over a period of time the ballast may become worn under the sleeper and eventually even the sub-soil structure may be damaged. Needless to say, one loose sleeper may cause dogspikes in adjoining the sleepers to tend to pull out and eventually a whole section of track may deteriorate and require reconstructing.

Now, while the abovegoing paragraph relates particularly to sleepers or cross-ties made from Australasian hardwoods such as karri and jarrah, many regions of the world lack adequate supplies of suitable hardwoods; either these hardwoods therefore have to be imported for use as sleepers or softwoods must be so utilized. If softwood sleepers are used, the difficulties encountered in the dogspiking of rails to sleepers are manifoldly increased to such a degree that the 'life' of such a softwood sleeper may be as brief as 20 weeks, particularly in very dry conditions such as may obtain when a railway line is built across a desert.

Irrespective of whether hardwoods or softwoods are to be employed, it is widely recognized that the conventional dogspike rail fastening has many shortcomings; for example:

(i) it may rapidly become loose, and in extremely wet or dry situations this may occur within a few months;

(ii) it is not capable of being tightened; thus in order to renew the fastening a fresh hole must be bored in the sleeper;

(iii) it does not hold well, or for long periods, in treated sleepers;

(iv) it cannot be removed and subsequently readily replaced when de-stressing or defective rail replacement operations become necessary;

(v) when it becomes loose the head portion tends to rotate about the spike axis so that it may well lose contact with the rail foot.

'Surfacing' of track is done mechanically by means of specialized machines which lift and align the rail to correct geometry. Such machines rely on the rail-to-sleeper fastening—that is to say, the dogspikes—to lift and align the sleepers correspondingly since they are designed to grip and move only the rail. Thus, if a sleeper is loose it will not lift with the rail and the durability of the final 'surface' will be decreased.

There again, a dogspike which has become loose will allow a degree of spread to occur and allow the rail foot to move outwardly under the sideways force and eventually override the outer shoulder. As has been said before, one defective dogspike may lead to defectiveness in neighboring ones. While one effectively spiked sleeper in four will sustain the gauge, four or more defective sleepers in a row may permit a rail under maximum loading conditions to move the required distance laterally to thereby cause a 'spread road' derailment.

As has been previously mentioned, the rails are inclined downwardly towards each other to mitigate the tendency for them to spread. This inclination prevents a good deal of 'hunting' movement of the wheels of a vehicle as it rides over the rails, 'hunting' being the side-to-side movement of the wheels which causes the flanges thereof to 'hammer' repeatedly against the sides of the rail head on alternate rails. This 'hammer' causes further spread and again tends to loosen the dogspikes.

Current practice on most railways throughout the world is to weld rails into long or even 'continuous' lengths, so eliminating expansion joints and increasing those forces tending to cause buckling of the rails. Resistance to this buckling depends largely on the effectiveness of the rail-to-sleeper fastening to prevent the rail rising from the sleeper plate and buckling independently of the rest of the track structure. This contretemps may well also cause a train to be derailed.

Many attempts have been made to obviate, or at least mitigate, the shortcomings detailed above but, to date, none has overcome all of them in a single embodiment.

With this in mind, it is an object of the present invention to overcome the manifold disadvantages inherent in the prior art and to this end there is thus provided, according to the present invention, an expanding-sleeve rail fastening which comprises a lug portion adapted to bear upon a rail foot; a headed bolt having a threaded end and being adapted to extend through an aperture in the said lug portion and beyond into a bore provided in a permanent way sleeper via a sleeper plate spiked thereto; a radially expandable sleeve surrounding the bolt and adapted to fit snugly into the bore; and a nut screwable onto the threaded end of the bolt; this arrangement being such that, when the sleeve is inserted into the bore and the lug portion brought to bear upon the rail foot, the headed bolt is rotatable so as to cause the nut to wedge in the lower end of the sleeve and, by continuing rotation of the bolt, to cause portions of the sleeve to be forced radially outwards; whereby the said sleeve portions are caused to grip the wall of the bore and whereby the lug portion is caused to firmly clamp the rail foot against the sleeper plate.

The lug portion may be a cast or drop-forged, generally L-shaped member, the bight of which—that is to say, the included faces of the two limbs of the 'L'—being adapted to bear upon the rail foot; however, it is preferred that this lug portion should comprise an upper, annular rail foot-bearing part and a lower tubular part concentric with the former part. These upper and lower parts of the lug portion may be integral, formed by turning or casting operations, but ideally they are separate parts which permit the lower, tubular part to be simply a suitable length of metal pipe.

Advantageously, a deformable collar or 'crush' is provided between the previously-described lug portion and the radially expandable sleeve, and this feature will be more fully described hereinafter.

The nut which is screwable onto the threaded end of the bolt is ideally a tapered nut and has a deformable insert, as is known in the prior art.

In order that the reader may gain a better understanding of the present invention, hereinafter will be described certain embodiments thereof by way of example only, and with reference to the accompanying drawings in which:

FIG. 1 is a somewhat schematic vertical section of the expanding-sleeve rail fastening;

FIG. 2 is a perspective view of the lug portion of the fastening; and

FIG. 3 shows an alternative lug portion.

The expanding-sleeve rail fastening illustrated in the drawings includes a lug portion, generally referenced 1, which may consist of an upper annular part 2 and a lower tubular part 3, best to be seen in FIG. 2. While these two parts may be fabricated integrally, as by casting, it is preferred that they be separate parts so as to permit lower part 3 to be simply cut from inexpensive metal tubing; the lower face may be bevelled as shown.

The undersurface of annular part 2 is contoured or profiled so as to fit over a shoulder 4 of the foot 5 of a permanent way rail.

A bolt 6 having a head 7 and a threaded end 8 extends through lug portion 1 and beyond, being surrounded, towards its end remote from head 7, by a radially expandable sleeve, generally referenced 9. Such a radially expandable metal sleeve may be a commercially obtainable lock-in masonry anchor, for example, the well-known 'LOXIN' type or Ramset's 'SHURE-SET' anchor. Sleeve 9 may be constructed to be radially expandable in any manner, however, and may well have a number of prong-bearing tongues, as 10, struck out of the wall of sleeve 9.

Screwable onto threaded end 8 of bolt 6 is a nut 11 which is tapered and provided with a deformable insert. As in the Ramset 'SHURE-SET' anchor, nut 11 may be held captive by a pair of gripping arms 12, the curved-in tips of which are accommodated in co-operating grooves in the outer wall of nut 11. When bolt 6 is rotated, tapered nut 11 is forced up into the lower end of sleeve 9 to thus bring about the lateral expansion of the walls of sleeve 9. Tongues 10 incline inwardly, when at rest, with their outwardly directed prongs lying within the confines of the sleeve walls, but when nut 11 is caused to rise up into the lower end of sleeve 9, tongues 10 are pressed radially outwards so as to cause the prongs to protrude beyond the sleeve.

Between the lug portion 1 and radially expandable sleeve 9 and surrounding bolt 6 there is an axially deformable collar or 'crush' 13, preferably of some suitable material such as reinforced rubber or the like which may, in fact, be a length of rubber hose. The purpose of this is to provide a gap between the lower face of lug portion 1 and the upper face of expandable sleeve 9 to enable the assembly to be 'tightened down' efficiently. Additionally, a captive washer 14 may be provided between collar 13 and sleeve 9, as may be a spring or star washer 15 between head 7 of bolt 6 and lug portion 1.

The components of the inventive fastening, that is to say, its metal components, may be made of such material as galvanized steel, or alternatively only bolt 6 and nut 11 may be, to better resist corrosion. As it is necessary that the bolt 6 should be removable when the assembled fastening is in situ, the nut 11 should not be able to rust onto the threads of bolt 6 and it is to this end that the previously mentioned deformable insert is provided, which insert may advantageously be made of a suitable plastics material such as nylon. The provision of the insert has a further advantage inasmuch that it decreases any possibility of nut 11 working loose as a result of vibration when the permanent way is in use.

FIG. 3 illustrates a modified form of the lug portion, which may be a metal casing. Containing less metal than the previously described lug portion 1, this modification is inherently cheaper to produce but its tongue 16 is required to be held in position on shoulder 4 of a rail foot 5 to prevent its turning when bolt 6 is tightened down.

When a length of rail to be affixed has been laid upon an array of sleeper plates lockspiked to their associated sleepers or cross-ties, each pre-assembled expanding-sleeve rail fastening is passed through a suitable hole in the sleeper plate and forced down into a commensurate, pre-drilled bore in the sleeper, so that the upper, annular part 2 of lug portion 1 bears correctly on shoulder 4 of the rail foot 5. The head 7 of bolt 6 is then rotated, forcing tapered nut 11 up into the lower end of sleeve 9 to thereby reduce the distance between nut 11 and head 7, and to force annular part 2 of lug portion 1 down onto shoulder 4 to clamp the rail and sleeper plate hard down onto the sleeper or cross-tie. At the same time, portions of the radially expandable sleeve 9 are forced laterally outwards to grip the wall of the bore.

Sufficient rotation of bolt 6 will ensure that the rail is firmly held down to the sleeper via the sleeper plate, and that the now-expanded sleeve will be far more tenaciously anchored in the bore than is a conventional dogspike forced into a similar bore in a sleeper. In the event of the expanded portions and/or the prongs loosening their hold in the sleeper, further turns of bolt 6 will restore the integrity of the fit of sleeve 9 in the bore.

Certain component parts of the expanding-sleeve rail fastening are reclaimable, namely the bolt 6 and the lug portion. Moreover, the bolt 6 may be loosened sufficiently for the rail to be removed for de-stressing or replacement. Replacement may be necessary because of such as milling, rolling or welding defects in a length of rail. The defective rail section, perhaps 6 meters of it, is sawn out and a replacement length welded into the gap. Hitherto, the dogspikes holding the length of rail have been removed where possible and re-used or replaced to secure the new length of rail. However, the integrity of their hold in the bores is destroyed and this can lead to deterioration of the track. With the present invention, the bolt 6 is merely screwed down harder, the only critical factor being the properties of the wood of the sleepers or cross-ties.

From the above-going description it will be readily apparent that the expanding-sleeve rail fastening according to the present invention is capable of maintaining its grip in a bore far more efficiently than is a conventional dogspike, and offers the following specific advantages:

(a) it will fit into, and can be tightened in, the hole left when a conventional dogspike works loose and can be pulled out;
(b) it is dimensioned to pass through the holes in a standard sleeper plate;
(c) it is capable of being re-tightened if and when it loosens in the bore in a sleeper;
(d) it is capable of being loosened for the purpose of de-stressing or rail section removing, and then subsequently retightened;
(e) it will not loosen its grip in the bore enough to permit a ballast-tamping machine to raise the rail without the sleeper(s);
(f) it may be tightened or loosened manually or mechanically;
(g) it is a relatively simple, lightweight article which is supplied pre-assembled;
(h) it provides an especially useful and quick solution to the loosening of dogspikes in situations where sleepers or transoms cannot be readily replaced— e.g. in cuttings, tunnels or on bridges;
(i) the lug portion and bolt are reclaimable;
(j) it can be used in unseasoned timber; as compared with a conventional dogspike considerably more extraction force is required to remove the inventive rail fastening; and,
(k) at present the cost per expanding-sleeve rail fastening is in the order of a mere $A1.20.

Thus, the reader will appreciate that, while the initial cost of each fastening according to the present invention is greater than the cost of a conventional dogspike, the overall cost to a given railway system over a period of some years may well be considerably reduced when it is taken into consideration that about one million sleepers have to be replaced each year in the Australian State of New South Wales alone, a large percentage owing to dogspike failure.

The claims defining the invention are as follows:

1. An expanding-sleeve rail fastening, comprising:
a lug portion adapted to bear upon a rail foot;
a headed bolt having a threaded end and adapted to extend through an aperture in said lug portion and beyond into a bore provided in a permanent way sleeper via a sleeper plate spiked thereto;
a sleeve having radially-expandable, pronged portions surrounding said bolt and adapted to fit snugly into said bore;
a deformable collar interposed between said lug portion and said sleeve; and
a captive nut screwable onto the threaded end of said bolt, said nut being tapered towards its bolt-head end: the arrangement being such that, when said sleeve is inserted into said bore and said lug portion brought to bear on said rail foot, said headed bolt is rotatable so as to cause said tapered nut to wedge in the lower end of said sleeve and, by continuing rotation of said bolt, to engage the radial inner surface of said pronged portions and to cause said pronged portions of the sleeve to be forced radially outwards; whereby said pronged portions are caused to grip the wall of said bore and whereby said lug portion is caused to firmly clamp said rail foot against said sleeper plate.

2. The expanding-sleeve rail fastening as claimed in claim 1, wherein said lug portion is a generally L-shaped member, a bight of which is adapted to bear upon said rail foot.

3. The expanding-sleeve rail fastening as claimed in claim 1, wherein said lug portion comprises an annular, upper, rail foot-bearing part and a lower tubular part concentric therewith.

4. The expanding-sleeve rail fastening as claimed in claim 3, wherein said upper and lower parts of said lug portion are integrally formed.

5. The expanding-sleeve rail fastening as claimed in claim 3, wherein said upper and lower parts of said lug portion are separate parts.

6. The expanding-sleeve rail fastening as claimed in claim 1, wherein said nut has a deformable insert.

* * * * *